(12) United States Patent
Johnson

(10) Patent No.: US 7,688,387 B2
(45) Date of Patent: Mar. 30, 2010

(54) 2-D COMBING IN A VIDEO DECODER

(75) Inventor: Shawn V Johnson, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1112 days.

(21) Appl. No.: 10/641,160

(22) Filed: Aug. 15, 2003

(65) Prior Publication Data
US 2005/0036070 A1 Feb. 17, 2005

(51) Int. Cl.
*H04N 9/78* (2006.01)

(52) U.S. Cl. ................. 348/665; 348/666; 348/667; 348/668

(58) Field of Classification Search ............ 348/663, 348/665, 667, 668, 669, 670, 664; *H04N 9/78*
See application file for complete search history.

(56) References Cited
U.S. PATENT DOCUMENTS 5,909,255 A * 6/1999 Hatano .................. 348/663
6,674,488 B1 * 1/2004 Satoh .................... 348/663
6,738,097 B2 * 5/2004 Satoh .................... 348/663
6,999,130 B2 * 2/2006 Tanigawa ................ 348/663
7,227,587 B2 * 6/2007 MacInnis et al. .......... 348/667
7,304,688 B1 * 12/2007 Woodall ................. 348/663

* cited by examiner

*Primary Examiner*—Trang U Tran
(74) *Attorney, Agent, or Firm*—Sterne, Kessler, Goldstein & Fox P.L.L.C.

(57) ABSTRACT

Separation of luma and chroma in a video. In an embodiment, values on a current line of the sampled video signal, at ¼-period intervals, are compared with values on a previous line of the sampled video signal, at ¼-period intervals. Values on the current line of the sampled video signal are compared to values on a subsequent line of the sampled video signal. This gives information about the vertical frequency content. Values on the current line are compared with values having the same chroma phase on the same line to provide information about horizontal frequency content. The data of vertical and horizontal frequency logic are used by the decision logic to determine the appropriateness of combing based on these comparisons. If combing is not appropriate, the signal is bandpass filtered instead of combed. The low-pass and combing filters are applied to the original signal, not an interpolated or resampled signal.

11 Claims, 14 Drawing Sheets

2-D COMBING IN A VIDEO DECODER

BACKGROUND OF THE INVENTION

1. Field of the Invention

The present invention is related to processing of video signals, and, more particularly, to comb filtering ("combing").

2. Background Art

A composite video signal is the sum of a luminance (brightness) signal and a chrominance (color) signal. These signals are also referred to as luma and chroma signals, respectively. The frequency ranges of the luma and chroma signals are designed to overlap.

A problem created by overlapping the luma and chroma frequency spectra is that it is difficult to separate them completely. Therefore, what is needed is a system and method to separate the luma and chroma signals with minimal effect on the quality of the incoming signal.

BRIEF SUMMARY OF THE INVENTION

The present invention is directed to combing in a video signal without affecting the quality of the original incoming composite signal. In an embodiment, the method compares points on a scan line triplet including previous, current, and subsequent scan lines. In an embodiment, points compared are points on consecutive lines at locations corresponding horizontally to ½ period from each other. These points are located on their respective lines at locations corresponding horizontally to ¼ period from the point of interest. Each of these comparisons is made between two points having the same phase. As with all points discussed, if the points compared have unknown values, the values are obtained through interpolation, resampling, or any other value-obtaining process known to one of skill in the art.

In an embodiment, points compared are points on consecutive lines at locations corresponding horizontally to the same location as the point of interest. Each of these comparisons is made between two points having opposite phases on consecutive scan lines. In an embodiment, comparisons are made between the point of interest and points on the current scan line that have the same phase as, e.g., that are a full cycle from, the point of interest on the current scan line.

Decision logic calculates the result of comparisons between the points, and determines whether a comb filter or a simple filter would produce the better result. The original signal is split between an interpolation stage, a filtering stage, and a signal path. The decision logic uses the results of the interpolation stage and the filtering stage to make its determination. The decision logic assigns a weight to the result of combing. The decision logic also assigns a weight to the result of filtering. The weights are complementary in that the combination is equal to 100% of the signal. Since the original signal is separated from the interpolation path before the point values are interpolated, combing and filtering are applied to the original signal rather than an interpolated or resampled signal. In an embodiment, the result of combing is the chroma signal. In another embodiment, the result of combing is the luma signal. For purposes of explanation, the present invention will be described herein with reference to the chroma being the result of combing. However, one of skill in the art will recognize that, in the present invention, luma may instead be the result of combing.

If the decision logic determines that a simple filter would be the more appropriate filter, the original signal is processed by a narrow bandpass filter and is not combed. In an embodiment, the result of filtering is the chroma signal. In another embodiment, a notch filter is used, and the result of filtering is the luma signal. As mentioned above, the present invention will be described with reference to chroma being the result of filtering. However, one of skill in the art will recognize that the luma signal may be the result of combing and filtering without departing from the spirit and scope of the invention.

Once chroma is determined, a processor subtracts the chroma signal from the original signal transmitted in the signal path. This subtraction results in the luma signal. In an embodiment where luma is determined, the subtraction will result in the chroma signal. In this manner, separate luma and chroma signals are output.

The present invention may be used in one or more of a set top box, a digital television decoder box, closed-circuit television, or TV-on-a-chip. One of skill in the art will recognize that these uses are given by way of example only, and are not limiting. One of skill in the art will recognize that the present invention may be used anywhere a video decoder is used.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
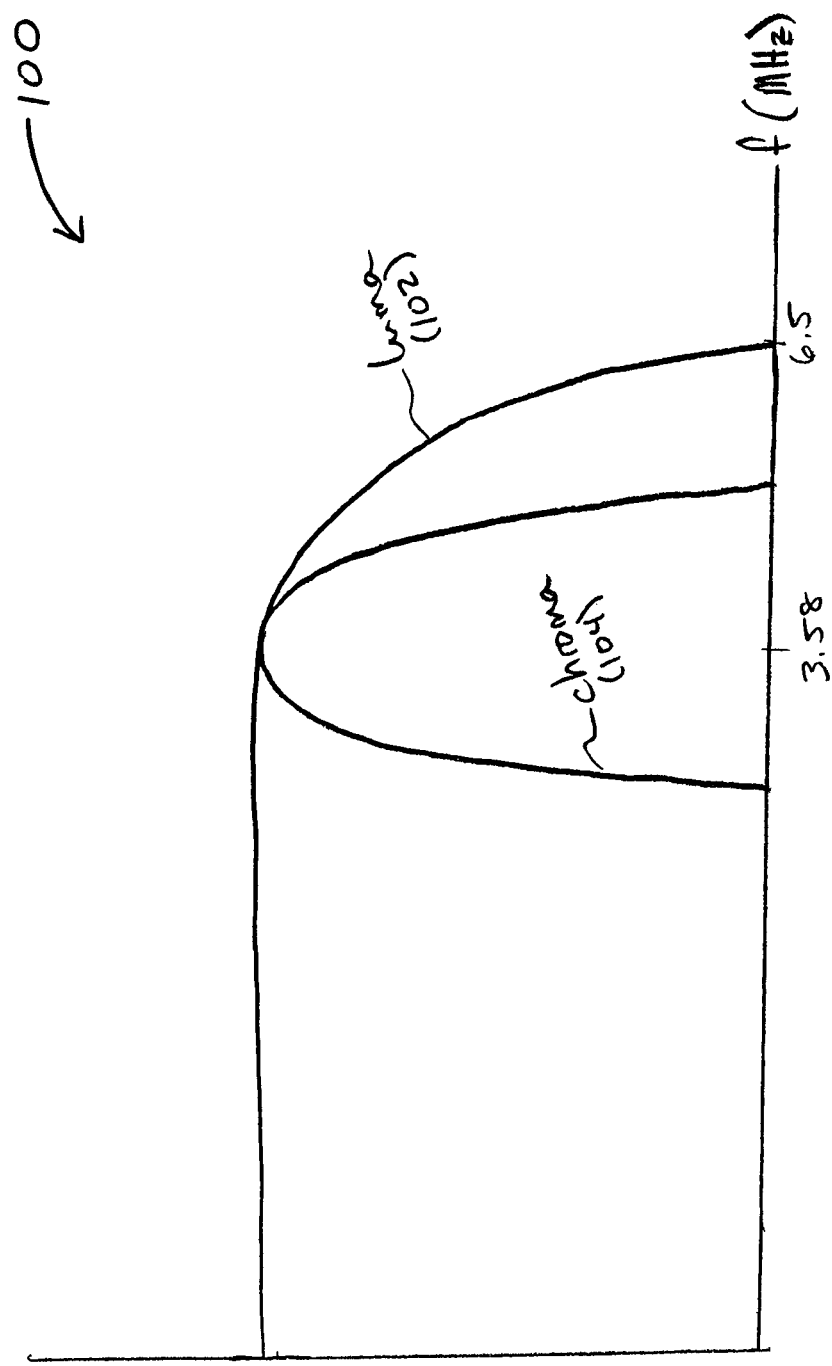
FIG. 1 is an illustration of overlapped luma and chroma signals.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

DESCRIPTION

A basic luma and chroma separator is a simple low-pass or bandpass filter. The luma signal is derived by filtering out the color information from the composite video signal with a low pass or notch filter. This works because the color information is in a frequency band centered at about 3.58 MHz. FIG. 1 is an illustration (not to scale) of the overlap between luma signal 102 and chroma signal 104 in a composite video signal. As can be seen, although lowpass filtering effectively filters most of chroma signal 104 out of the luminance signal 102, it also removes the higher frequency luma signal components. This loss of bandwidth reduces the horizontal resolution of the luminance signal 102, and fine details in the picture are lost.

Similarly, the chroma signal 104 can be separated from the composite video signal 100 by using a bandpass filter centered at about 3.58 MHz to obtain only the frequencies between about 3.0 MHz and 4.2 MHz. As shown in FIG. 1, this does not completely filter out the luma present at that frequency, so picture quality remains limited.

A more advanced filter is known as a comb filter. A comb filter operates on a composite video line triplet by delaying the previous horizontal scan line, and subtracting or adding it to the current horizontal scan line. In the video signal, the phase of the chroma signal is shifted by 180 degrees after each scan line, meaning that the chroma, but not the luma, is inverted at every other line. Because of this feature, inherent in the video signal, adding two lines together cancels the chroma signal and provides twice the luma signal. Similarly, subtracting the current line from the previous (delayed) line provides twice the chroma signal. From these results, luma and chroma at a point of interest may be determined. The next scan line is then processed with a delayed version of the current scan line. The comb filter continues to step down through the video field a line at a time, continuously generating the separated luma and chroma signals as the field is scanned. However, a basic comb filter cannot separate the luma and chroma signals correctly when there is a change in either luma or chroma values between two consecutive scan lines.

The present invention is directed to a 2-D adaptive comb filter that filters the video information both horizontally along the scan lines and vertically between the horizontal scan lines. To filter horizontally, a low-pass or bandpass filter is used. To filter vertically, a combing procedure is used. Adaptive logic solves the problem of combing at a vertical color transition point. The logic examines three successive horizontal scan lines simultaneously. At a vertical transition between two colors, either the top two or bottom two scan lines will usually be the same. Initially, for example, the top two of three scan lines will be the same color. The logic directs those lines to a digital version of the comb filter. When the scan moves down another line, the scan line triplet includes a new bottom line. The bottom two scan lines of the new triplet will have the new color, and the bottom lines will be directed to the comb filter. In this manner, two lines with different colors are not input to the comb filter at a transition boundary.

Figure 2:
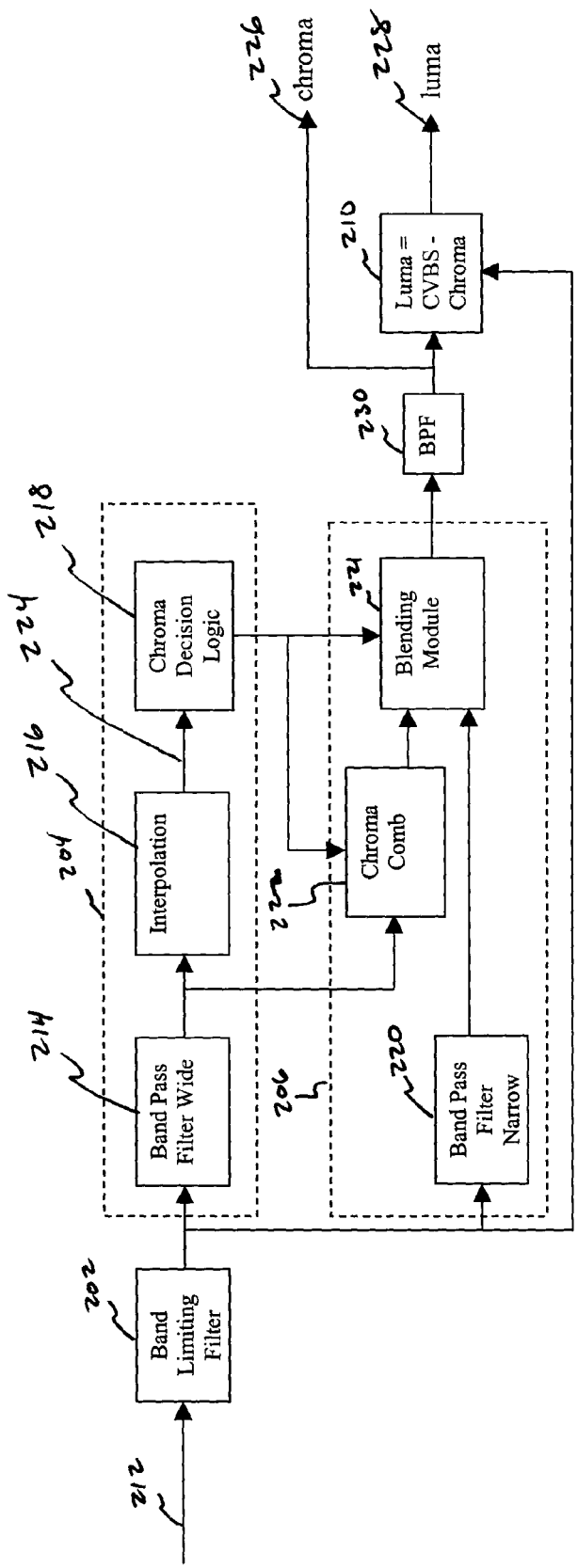
FIG. 2 is a block diagram of an implementation of the present invention.

FIG. 2 is a block diagram of an adaptive comb filter 200 according to the present invention. Comb filter 200 includes band limiting filter 202, decision stage 204, blending stage 206, and processor 210. Original signal 212 is a composite video signal including luma and chroma subcarriers. Original signal 212 enters band limiting filter 202 after passing through an analog-to-digital converter ("ADC") (not shown). After band limiting filter 202, original signal 212 is split among three different paths. The first path is decision stage 204. Decision stage 204 includes wide bandpass filter 214, interpolator 216, and chroma decision logic 218. The second path is blending stage 206. Blending stage 206 includes narrow bandpass filter 220, chroma comb filter 222, and blending module 221. The third path leads directly to processor 210.

Figure 3:
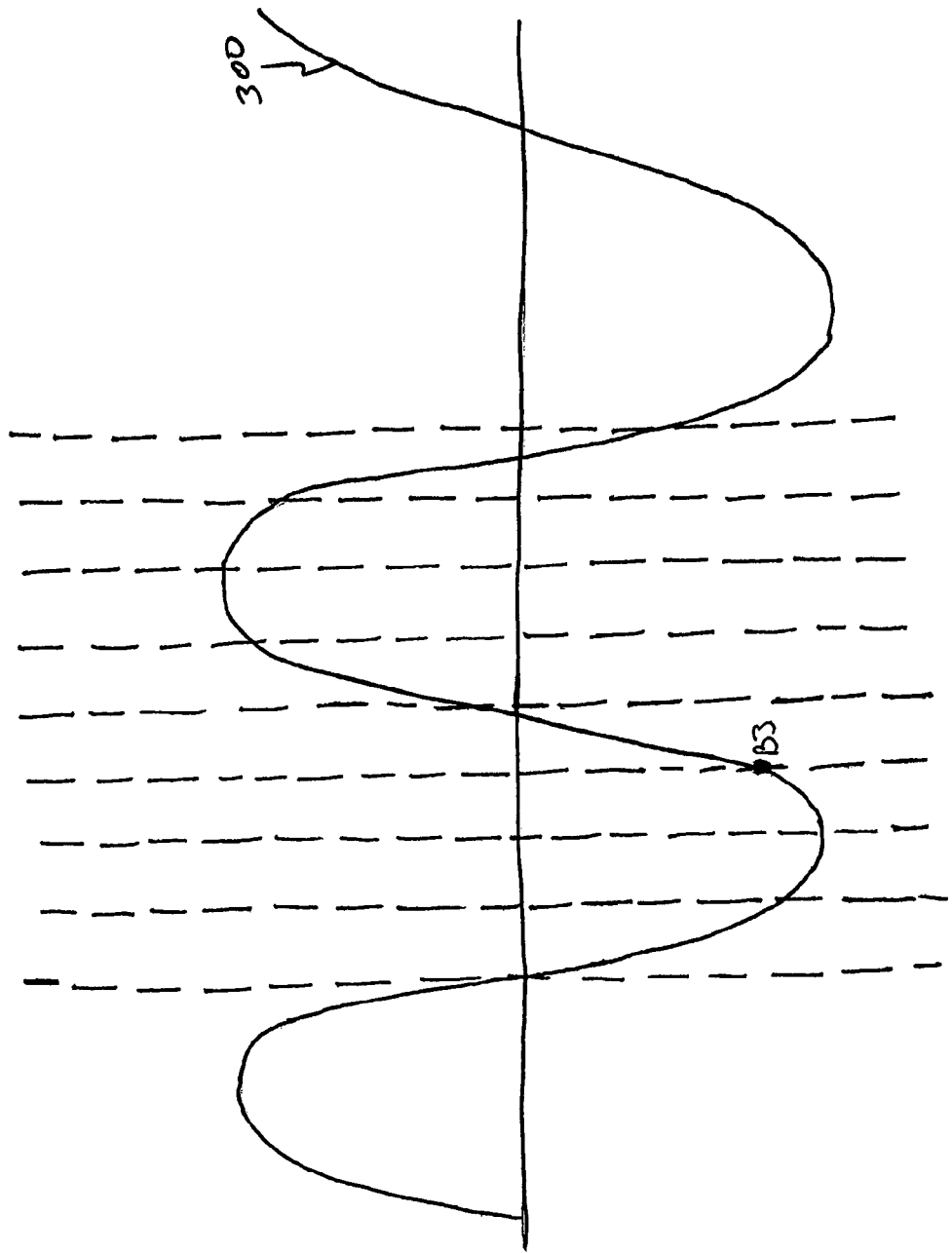
FIG. 3 is an illustration of a waveform having a sample rate of approximately 7.5 samples per period.

Original signal 212 enters the system 200 at a rate of, for example, 27 MHz, or approximately 7.5 samples per cycle, as shown in FIG. 3. Other sample rates may also be used, as will be apparent to one of skill in the art. Wide bandpass filter 214 extracts a subcarrier signal 300 from the original signal. A point of interest B3 is chosen, at which point luma and chroma are to be separated. For purposes of explanation, a scan line triplet of a video signal includes a previous line, a current line, and a subsequent line. In an embodiment, point B3 is located on the current line of the scan line triplet. To determine the separability of luma and chroma at point B3, point B3 is compared to other points in the scan line triplet.

Figure 4:
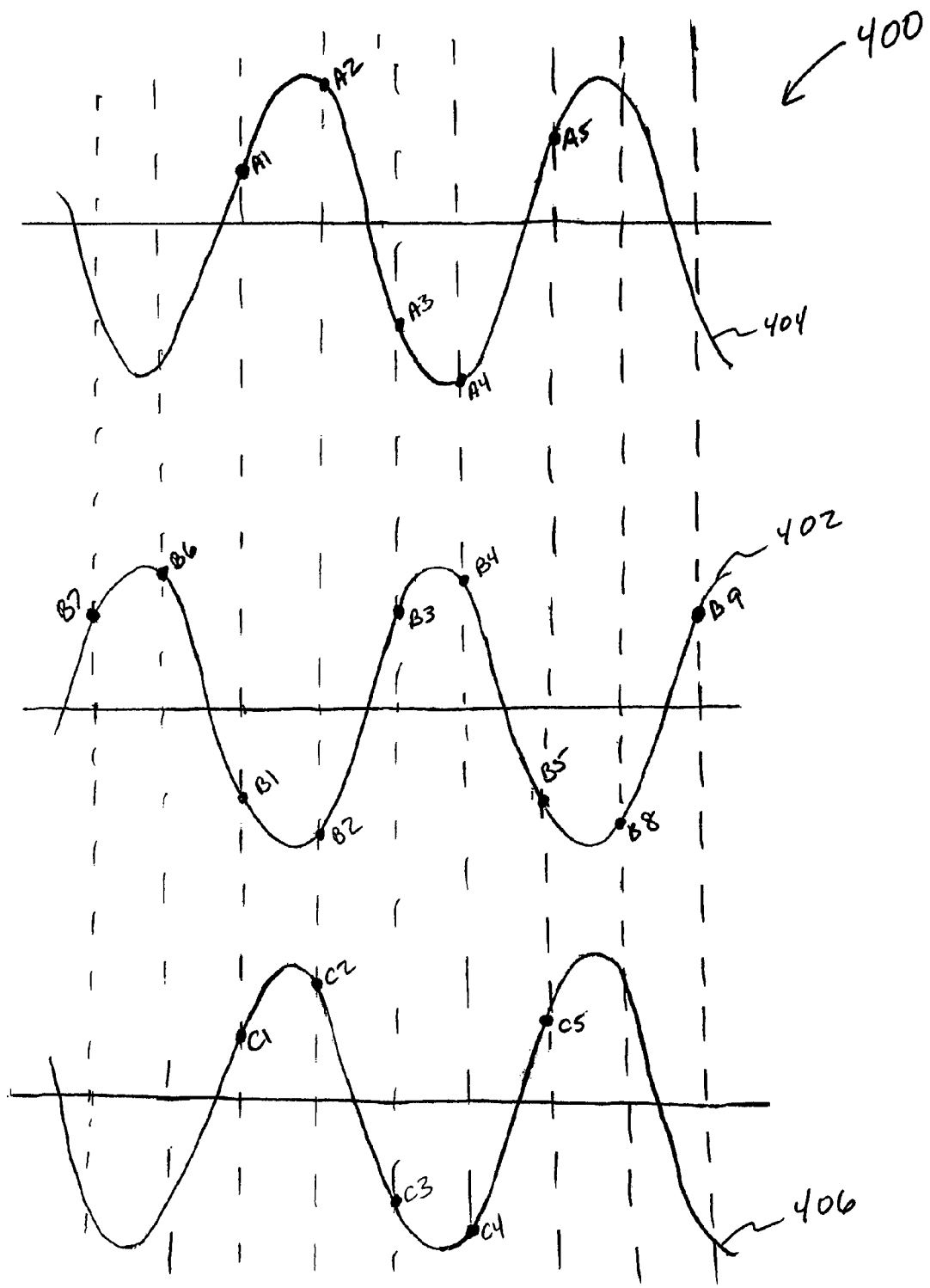
FIG. 4 is a timing diagram of a scan line triplet.

FIG. 4 is an illustration of a scan line triplet 400, including a current line 402, a previous line 404, and a subsequent line 406. In an embodiment, points compared are points on consecutive lines at locations corresponding horizontally to ½ period from each other. These points are located on their respective lines at locations corresponding horizontally to ¼ period from the point of interest. Each of these comparisons is made between two points having the same phase. One of skill in the art will recognize that points on consecutive scan lines corresponding horizontally to any multiple of ¼ period (e.g., ½ period) on each side of point B3 may also be compared, as long as the points compared have the same phase. Comparing points that are only ¼ period from point B3 also has the advantage of detecting localized or transient events. For example, point B2 is located on the current line of the triplet at ¼ period prior to point of interest B3. Similarly, point B4 is located on current line 402 of the triplet at ¼ period after point B3. Following the same annotation, points A2, A3, and A4 are located on previous line 404, at locations corresponding horizontally points B2, B3, and B4, respectively. Points C2, C3, and C4 are located on subsequent line 406 of the triplet, at locations corresponding horizontally to points B2, B3, and B4, respectively.

As shown in FIG. 4, points A2 and B2 have opposite phases of chroma; points B2 and C2 also have opposite phases of chroma. This results from the 180 degree phase shift of the chroma signal after each scan line. Chroma phases are also opposite between points A4 and B4, B4 and C4, A3 and B3, and B3 and C3.

On the other hand, points A2 and B4 have the same phase; points B2 and C4 also have the same phase. The phases are also the same between points A4 and B2, and B4 and C2. Extending further on the current line of the triplet, points B7, B3, and B9 are all in phase.

Figure 5:
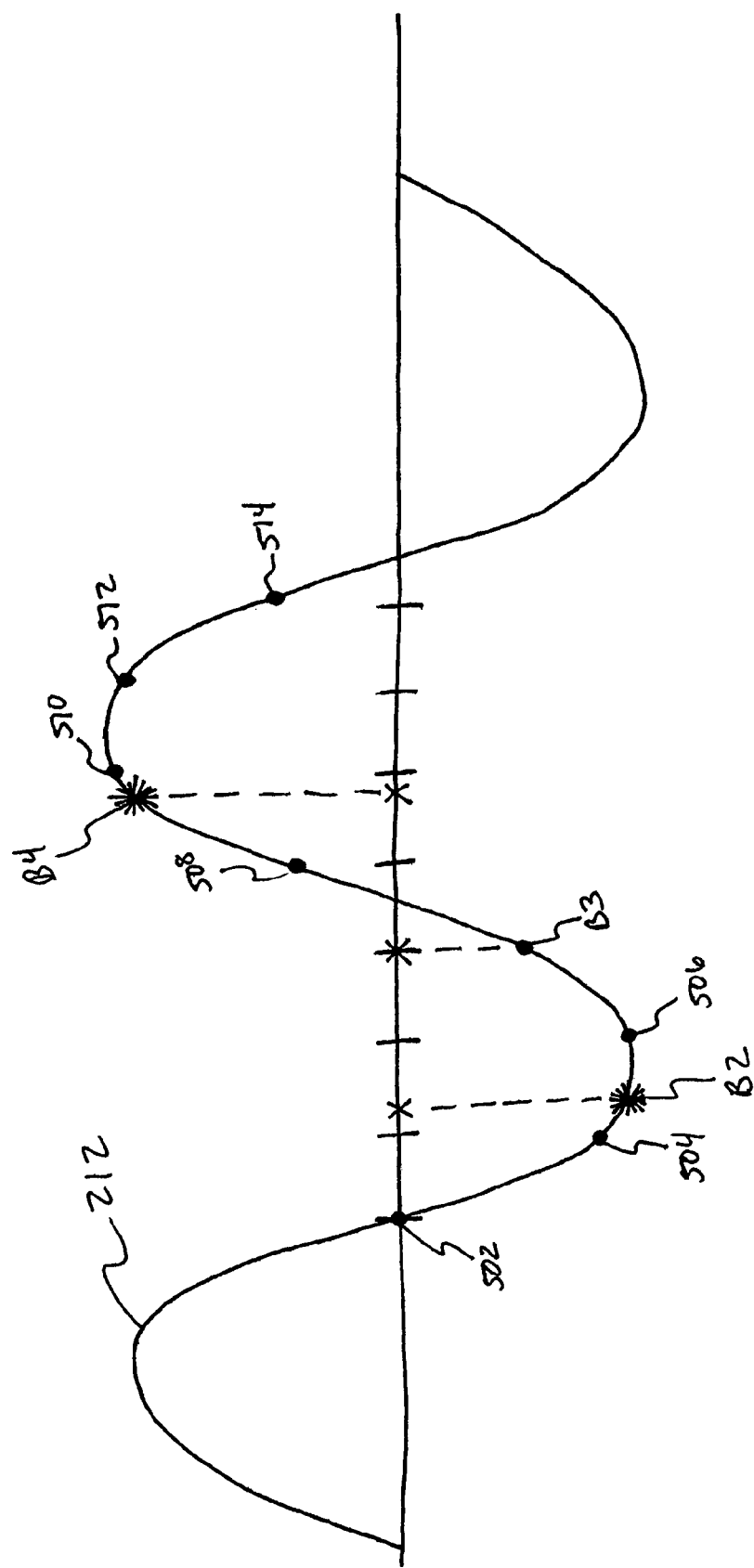
FIG. 5 is an illustration of a single scan line.

Because original signal 212 has a sample rate of, for example, 27 MHz, or approximately 7.5 samples per period, values for points that are exactly ¼ period from the point of interest B3 may not be readily available. An example of this dilemma is shown in FIG. 5. Points 502-514 are samples included in original signal 212. Point B2 is located −¼ period from point of interest B3, and point B4 is located +¼ period from point of interest B3. Since the values of points B2 and B4 will be used to determine the probability of success of combing at point B3, it is necessary to obtain the values of points B2 and B4. In an embodiment, the values of points B2 and B4 are interpolated. In another embodiment, signal 212 is resampled to obtain their values. One of skill in the art will recognize that other methods may be used to obtain the values of points B2 and B4. Through these same methods, the values of other points shown in FIG. 4 may be obtained. For ease of explanation, these points will be referred to as interpolated points, though other methods may be used to obtain them. Similarly, one of skill in the art will recognize that interpolator 216 may be an interpolator, a resampler, and/or any other type of device used to obtain the values of non-sampled points. These interpolated points are then output from interpolator 216 as interpolated signal 224, along with original samples of original signal 212.

Interpolated signal 224 and the original samples then enter chroma decision logic 218. Chroma decision logic 218 compares the values of the interpolated points and/or original samples on the scan lines (e.g., 402, 404, and 406) to determine whether original signal 212 may be successfully combed.

Figure 6:
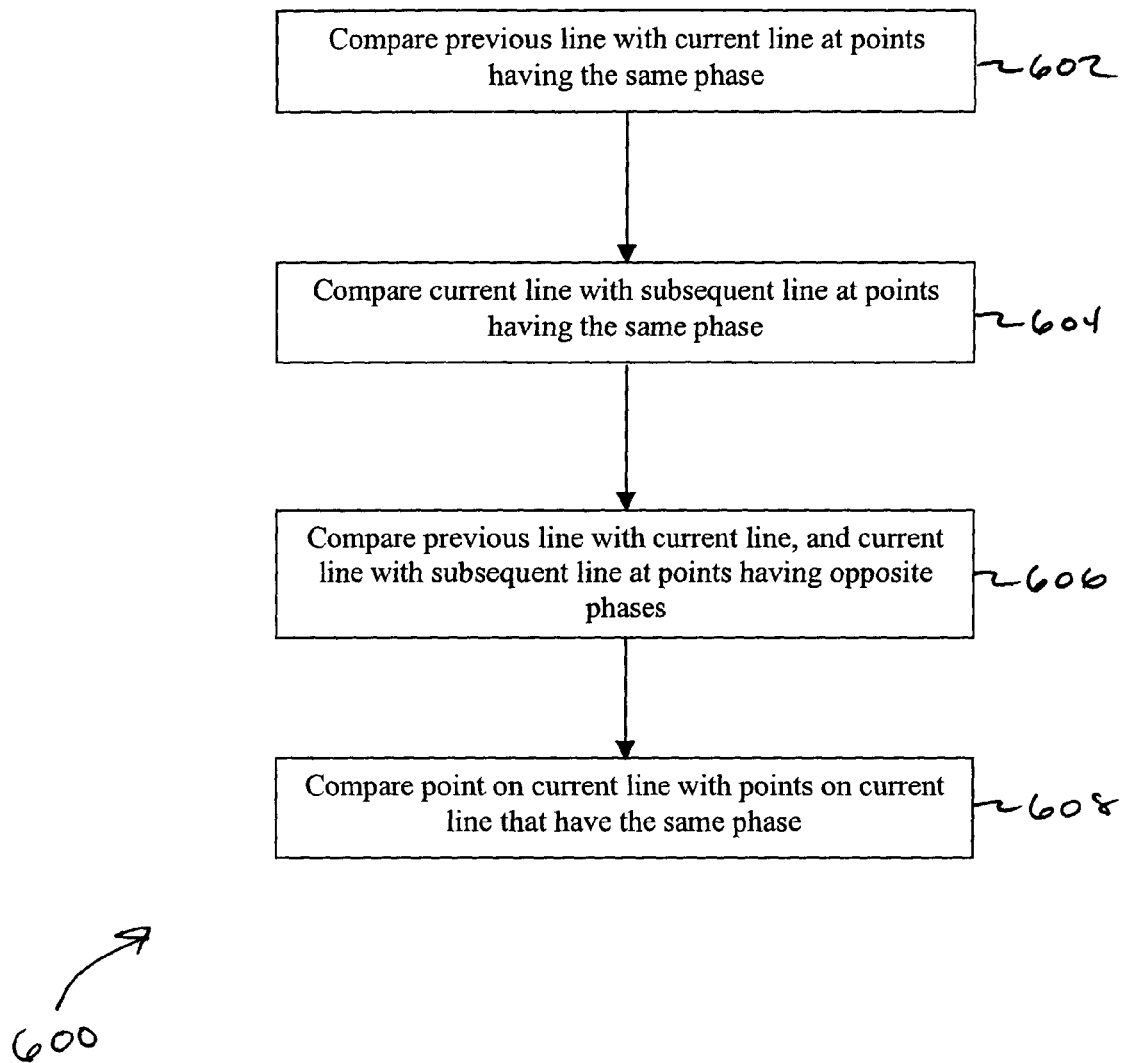
FIG. 6 is a flowchart of an embodiment of the present invention.
Figure 7:
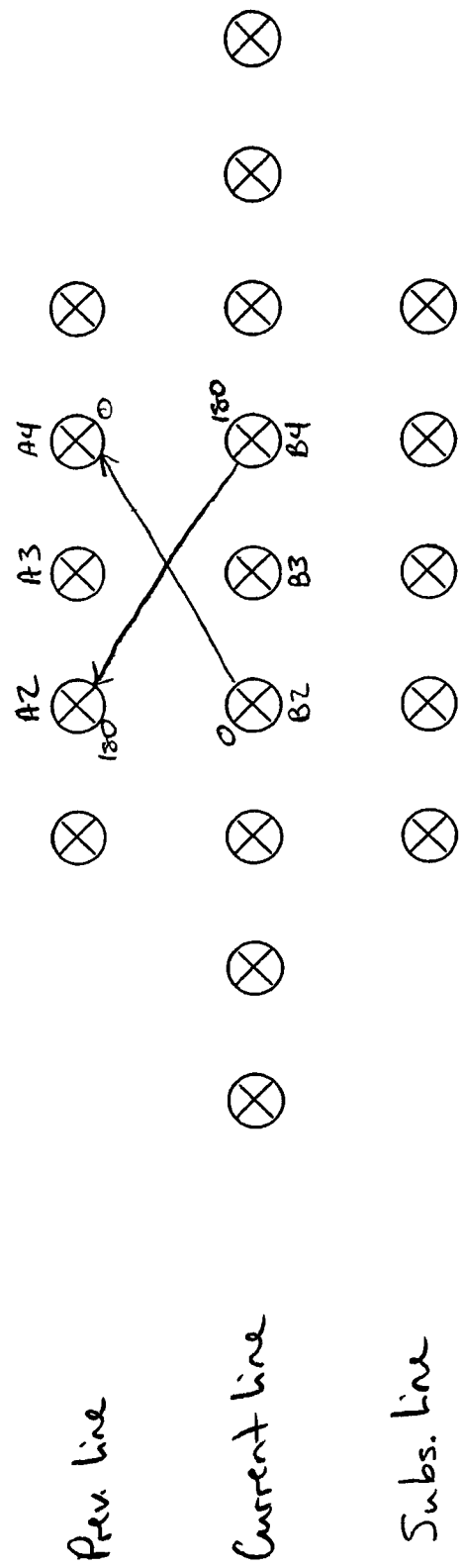
FIG. 7 is an illustration of comparisons made in an embodiment of the present invention.
Figure 8:
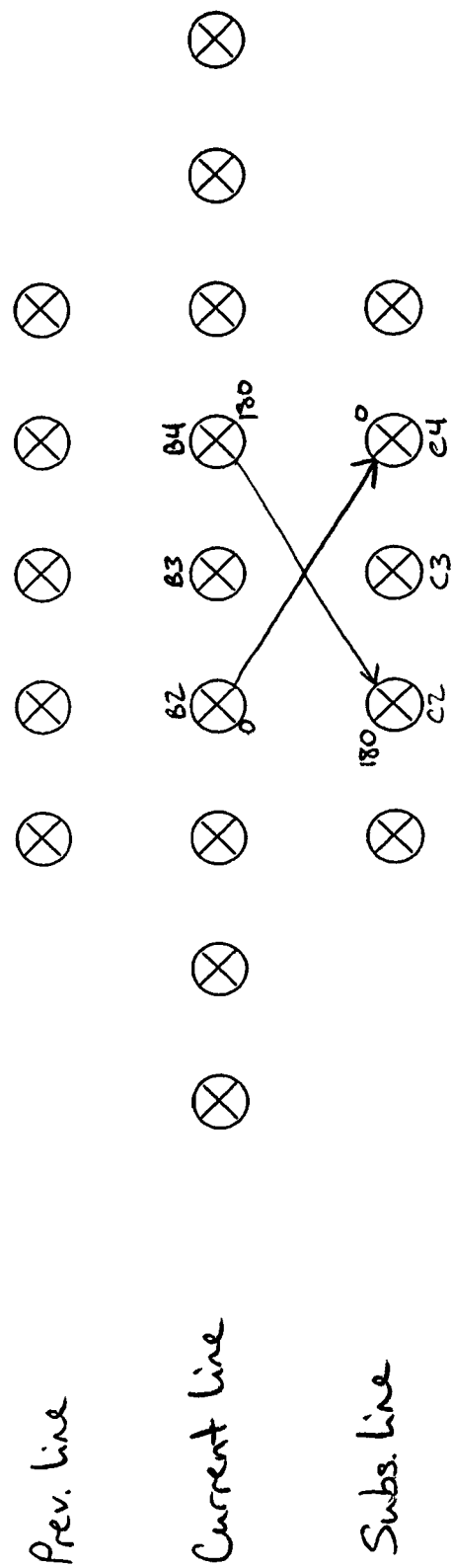
FIG. 8 is another illustration of comparisons made in an embodiment of the present invention.

FIG. 6 is a flowchart of an embodiment of a method for deciding whether to comb or to use a simple filter. FIG. 6 is described with reference to FIG. 4. The flowchart of FIG. 6 is not, however, limited to the timing diagrams of FIG. 4. In step 602, points on the previous line 404 are compared with points on the current line 402 that have the same respective phases. An illustration of the comparisons made in step 602 is shown in FIG. 7. In step 604, points on the current line are compared with points on the subsequent line that have the same respective phases. An illustration of the comparisons made in step 604 is shown in FIG. 8.

Figure 9:
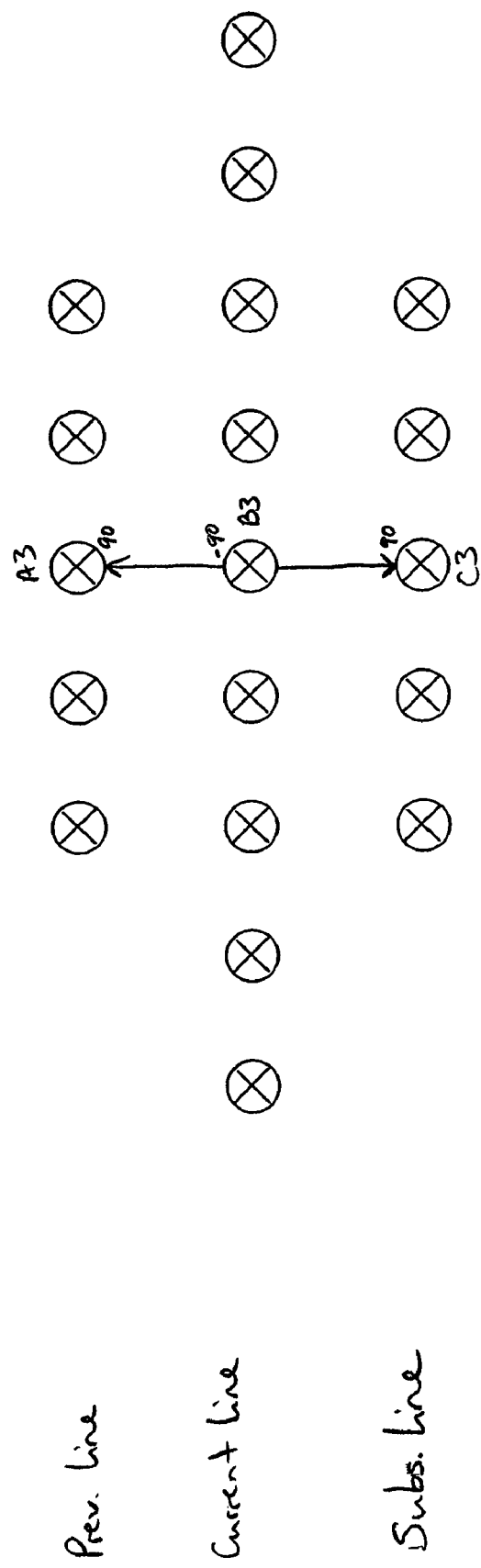
FIG. 9 is another illustration of comparisons made in an embodiment of the present invention.

In step 606, the previous line is compared with the current line, and the current line is compared with the subsequent line at points that have alternating opposite phases. An illustration of the comparisons made in step 606 is shown in FIG. 9.

Figure 10:
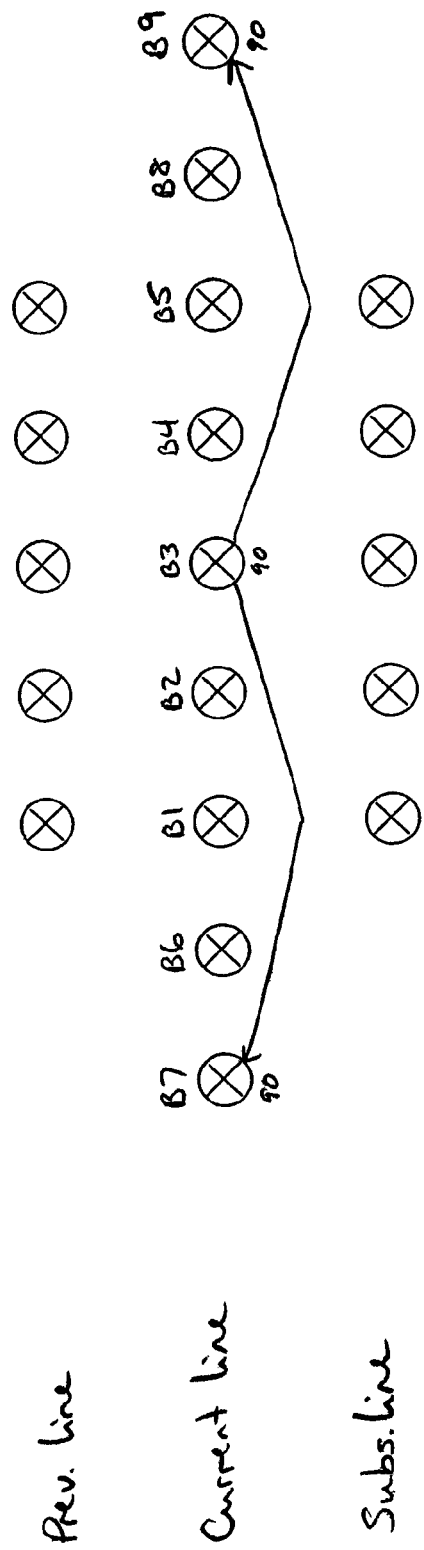
FIG. 10 is another illustration of comparisons made in an embodiment of the present invention.

In step 608, point of interest B3 on the current line is compared with other points on the current line that have the same phase as the point of interest, such as points that are a full cycle away from point B3. An illustration of the comparisons made in step 608 is shown in FIG. 10.

Figure 11:
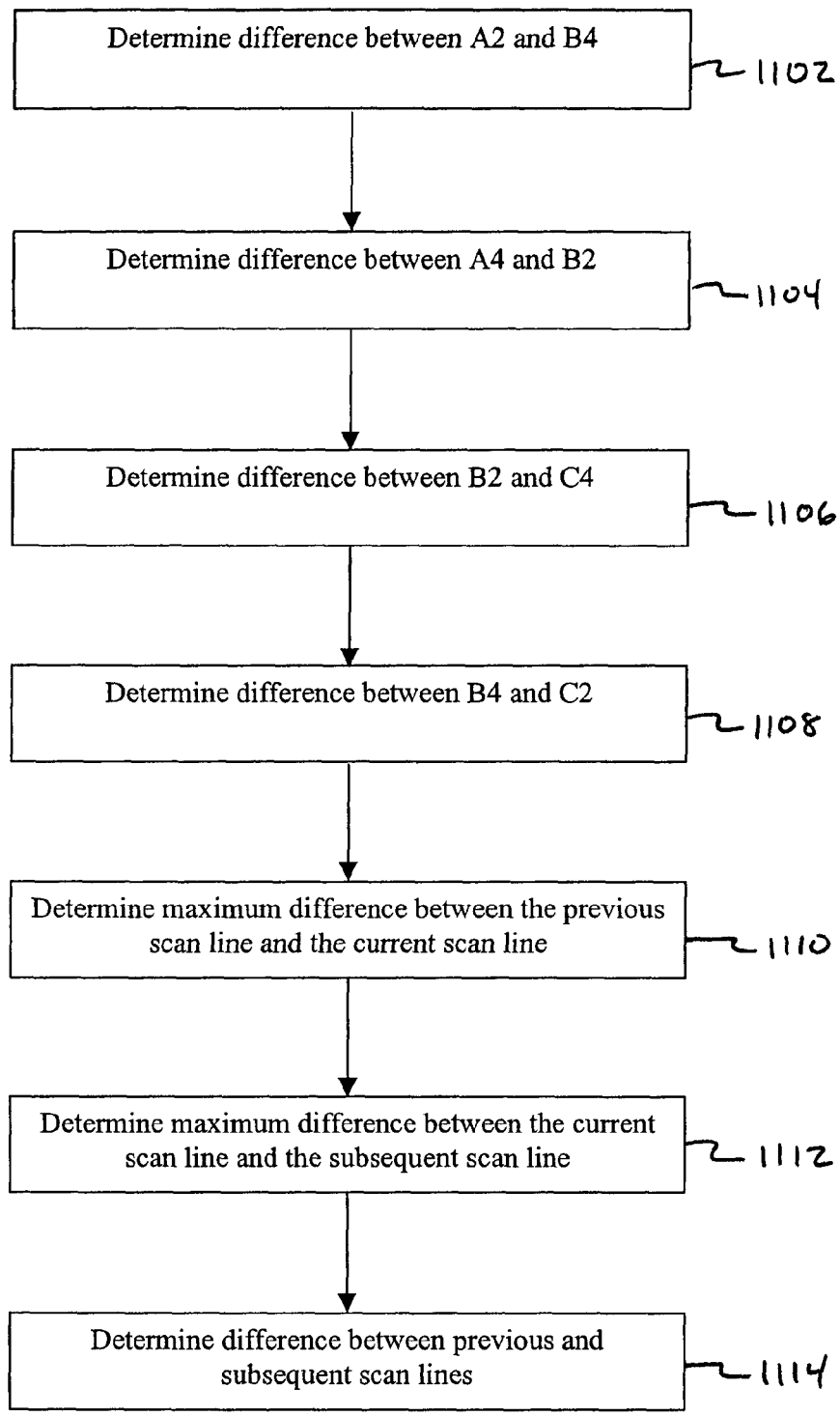
FIG. 11 is another flowchart in accordance with the present invention.

FIG. 11 is a flowchart that further details steps 602 and 604. In particular, steps 1102, 1104, and 1110 expand on step 602. Likewise, steps 1106, 1108, and 1112 expand on step 604. Reference may also be made to FIGS. 7 and 8. In step 1102, a difference between the values of points A2 and B4 is determined. In step 1104, a difference between the values of points A4 and B2 are determined. In step 1106, a difference between the values of points B2 and C4 are determined. In step 1108, a difference between the values of points B4 and C2 are determined. Step 1110 uses the differences found in steps 1102 and 1104 to determine a maximum and minimum difference between the previous scan line and the current scan line of the triplet. In an example computer algorithm, these values may be referred to as prev_line_max and prev_line_min. They may be calculated by the algorithm using the formulas Max(Abs(B4−A2), Abs(B2−A4)) and Min(Abs (B4−A2), Abs(B2−A4)).

Step 1112 uses the differences found in steps 1106 and 1108 to determine the maximum difference between the current line and the subsequent line. In the example algorithm discussed above, these values may be referred to as next_line_max and next_line_min. They may be calculated by the algorithm using the formulas: Max(Abs(B4−C2), Abs(B2−C4)) and Min(Abs(B4−C2), Abs(B2−C4)).

The results of steps 1110 and 1112 are further used in step 1114, to determine a difference between the previous and the subsequent scan lines of the triplet. In the example algorithm, this value may be referred to as min_vert. It may be calculated by the algorithm using the formula: Min(prev_line_max, next_line_max).

If the result of step 1110 is relatively small, then there is probably little difference between the previous scan line and the current scan line. This means that the previous and current scan lines can likely be combed successfully. Similarly, if the result of step 1112 is relatively small, then there is probably little difference between the current scan line and the subsequent scan line, and the lines can likely be combed successfully. If the result of step 1114 is also relatively small, then the two sets of combed lines can probably be blended successfully. In an embodiment, the results of combing each set of lines are weighted. These weighted values are then used to blend the results in blending module 221.

However, if the result of step 1110 is not relatively small, then a change likely occurs between the previous and current scan lines of the signal. These two lines should offer minimal weight to the blending determination. In this instance, if the result of step 1112 is still small, combing between the current and subsequent scan lines should be weighed most heavily in the blending determination.

Likewise, if the result of step 1110 is relatively small while the result of step 1112 is not, then a change probably occurs between the current and subsequent scan lines. In this case, combing between the previous and current scan lines should offer the greater weight to blending, while combing between the current and subsequent scan lines should offer minimal weight to blending.

Figure 12:
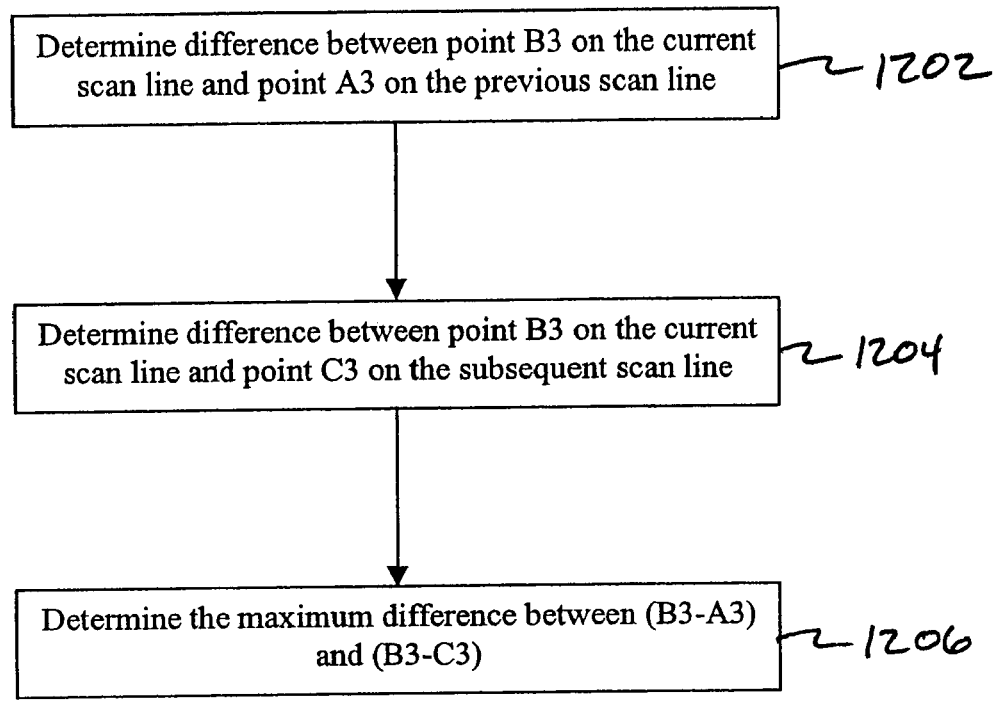
FIG. 12 is another flowchart in accordance with the present invention.

FIG. 12 is a flowchart further detailing an embodiment of step 606. Reference may also be made to FIG. 9. In step 1202, a difference is determined between point B3 on the current line and point A3 on the previous line. In step 1204, a difference is determined between point B3 on the current line and point C3 on the subsequent line. In step 1206, a comparison is made between the results of step 1202 and step 1204. In an embodiment, step 106 determines the maximum value of the results of step 1202 and step 1204. In the example algorithm discussed above, this value may be referred to as same_pix_max. It may be calculated by the algorithm using the formula: Max(Abs(B3−A3), Abs(B3−C3)).

Because of the alternating phases of chroma, if there is a significant amount of chroma, the result of step 1206 will be relatively large. However, if there is no significant amount of chroma and no significant luma change, the result of step 1206 will be relatively small, and combing can probably be used successfully. If the result of step 1206 is not relatively small, then there is either chroma or a change in luma, so the diagonal comparison described with respect to steps 602 and 604 of method 600 must be used.

Figure 13:
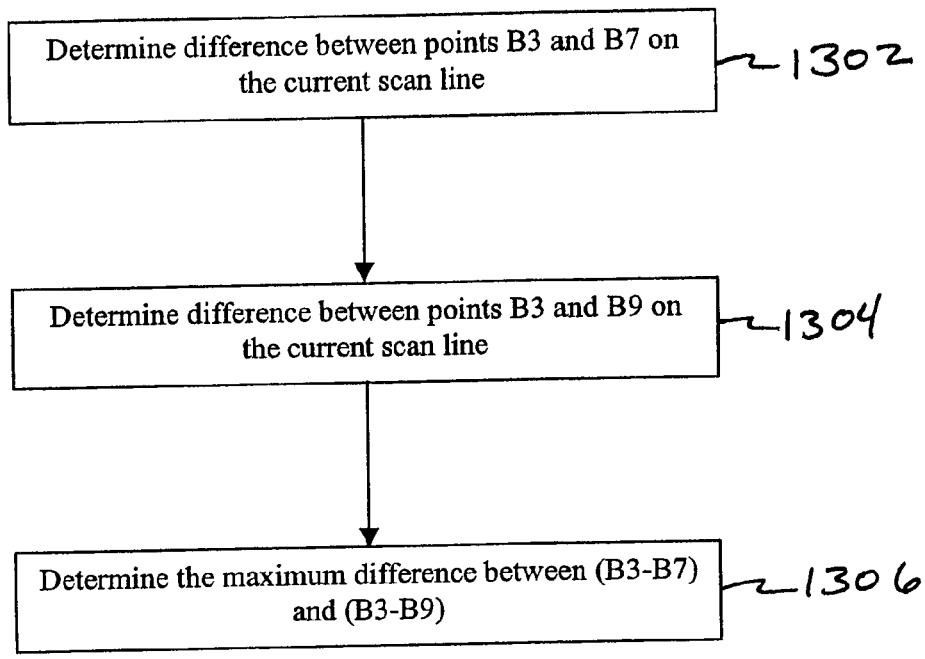
FIG. 13 is another flowchart in accordance with the present invention.

FIG. 13 is a flowchart illustrating an embodiment of step 608. Reference may also be made to FIG. 10. In step 1302, a difference is calculated between the values of point of interest B3 and point B7, which is located one or more cycles prior to point B3. In step 1304, a difference is calculated between the values of point of interest B3 and point B9, which is located one or more cycles after point B3. Step 1306 determines a maximum difference between the results of steps 1302 and 1304. In the example algorithm discussed above, this value may be referred to as next_pix_max. It may be calculated by the algorithm using the formula: Max(Abs(B3−B9), Abs (B3−B7)).

After chroma decision logic 218 makes a combing decision based on the above-described calculations, the decision information is input into chroma comb filter 222. Chroma comb filter 222 combs original signal 212 based on the combing decision. Original signal 212 enters chroma comb filter 222 after separating from interpolation stage 204. This separation from interpolation stage 204 allows combing to be applied to the original signal 212, rather than the interpolated and/or resampled signal 224.

If the result of step 1306 is relatively small, the signal probably has not changed horizontally at the current scan line. However, if the difference is not relatively small, a change in the signal may have occurred. This information is used in conjunction with vertical change information from steps 602, 604 and 606 of method 600 (e.g., by blending module 221) to determine how much weight should be applied to the result of combing relative to the result of filtering. The weighting procedure acts as a trade-off between the quality of the horizontal frequency content and that of the vertical frequency content. When there is more vertical content, more weight is given to the result of combing, which filters vertically. When there is more horizontal content, more weight is given to the result of standard filtering, which filters horizontally. The addition of these weighted results in blending module 221 provides the output signals.

For example, if neither luma nor chroma have changed horizontally, more weight may be provided to the result of the band-pass filter to obtain the luma and chroma at the point of interest B3. In this case, combing may be given less weight, and simple filtering of original signal 212 may be given more weight without losing significant image quality. If a change in the signal horizontally may have occurred, less weight should be given to the result of the simple filter.

Figure 14:
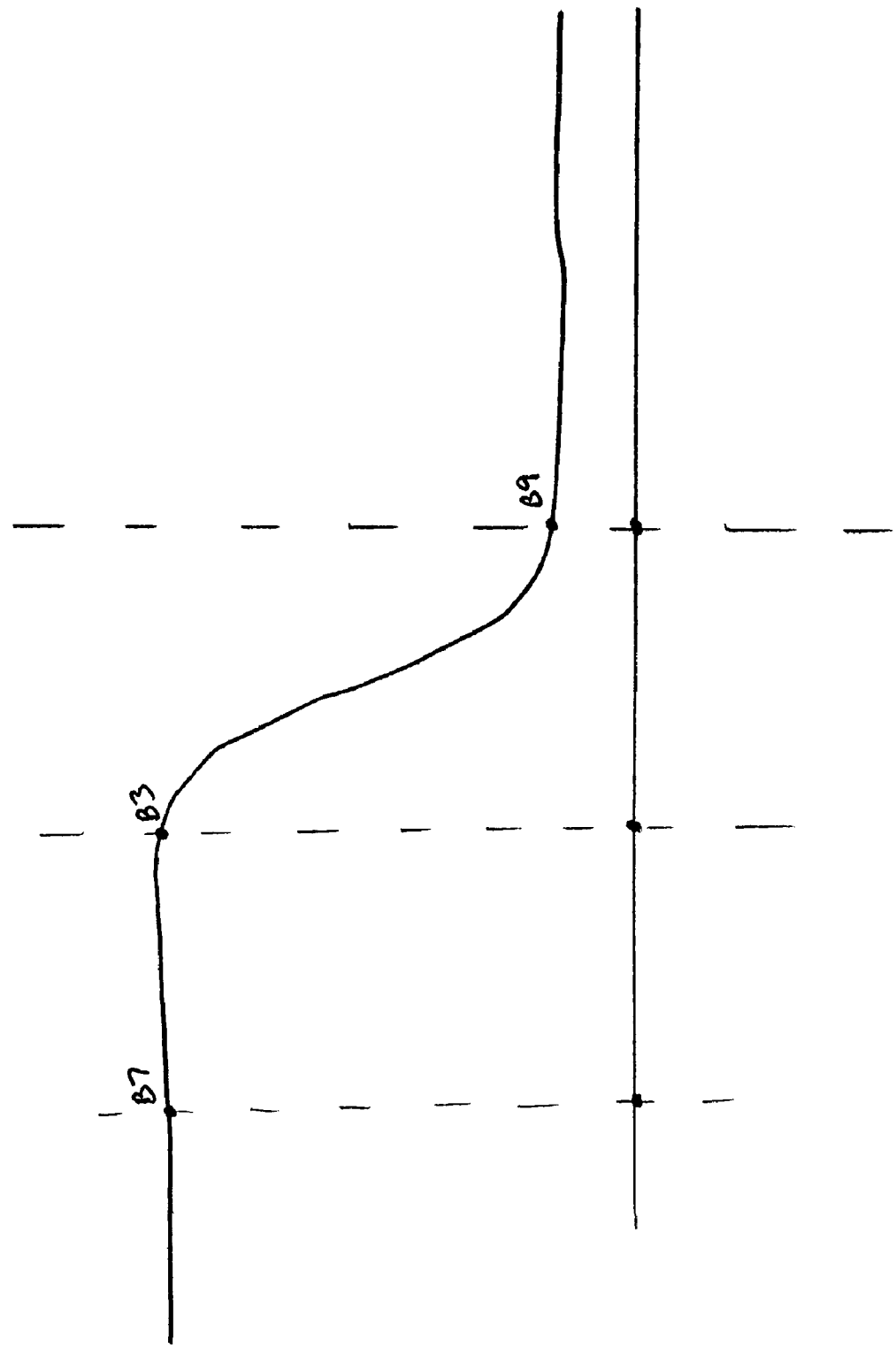
FIG. 14 is an illustration of a scan line transient.

FIG. 14 illustrates an example transient in video signal 212. Although a minimal difference would be calculated between B3 and B7 as located in FIG. 14, a large difference would be calculated between B3 and B9. In this manner, a transient may be detected.

Blending module 221 receives the outputs of chroma comb filter 222 and narrow bandpass filter 220. Blending module 221 applies a weight to each of the outputs. The weighted outputs are then combined and output as chroma signal 226.

If the decision information from chroma decision logic 218 favors combing, then blending module 221 gives more weight to the output of chroma comb filter 222.

If chroma decision logic 218 decides that combing is inappropriate, or that a simple filter could be applied more efficiently to achieve similar results, blending module 221 applies minimal weight to the output of chroma comb filter 222. Instead, most of the weight of the signal is provided by the output of narrow bandpass filter 212. The output of narrow bandpass filter 212 is the result of filtering original signal 212.

After blending module 221 weights and blends the outputs of chroma comb filter 222 and narrow bandpass filter 212, processor 210 receives original signal 212. Processor 210 then extracts the luma signal from original signal 212. The luma signal is extracted by subtracting the chroma signal, which is output from chroma comb filter 222, from the original signal 212. The luma information is then output from luma output 228 at the same time chroma information is output from chroma output 226.

In an embodiment, a bandpass filter 230 filters chroma signal 226. This results in a sharper image that the unfiltered signal.

It will be apparent to one of skill in the art that a luma comb filter could be substituted for chroma comb filter 222. In this case, a luma signal would be output from the comb filter, and the luma would be subtracted from the original signal 212 to obtain an output chroma signal.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of processing an original video signal, wherein a sample of interest is B3, comprising:
   (a) receiving a sampled video signal;
   (b) identifying a sample of interest on a current line of the sampled video signal;
   (c) comparing, with a decision logic device, values from a current line of the sampled video signal with values of a previous line of the sampled video signal and with values of a subsequent line of the sampled video signal, wherein at least a portion of the values represent the sampled video signal between original samples and wherein comparing comprises:
      (i) obtaining a value B2 from the current line of the sampled video signal at ¼ period prior to the sample of interest B3;
      (ii) obtaining a value B4 from the current line of the sampled video signal at ¼ period after the sample of interest B3;
      (iii) obtaining values A2, A3, and A4 from the previous line of the sampled video signal, whereby the values A2, A3, and A4 correspond horizontally to the values B2, B3, and B4, respectively;
      (iv) obtaining values C2, C3, and C4 from the subsequent line of the sampled video signal, whereby the values C2, C3, and C4 correspond horizontally to the values B2, B3, and B4, respectively;
      (v) determining a difference between the values B2 and A4, and between the values B4 and A2;
      (vi) determining a difference between the values B2 and C4, and B4 and C2; and
      (vii) determining a difference between the values B3 and A3, and between the values B3 and C3;
   (d) applying, with a blending device, weights to outputs of a plurality of video processing procedures for the sample of interest based on the comparison of step (c); and
   (e) outputting a processed signal from the blending device, wherein the processed signal comprises a combination of a portion of the outputs from each of the plurality of video processing procedures according to the applied weights.

2. The method according to claim 1, wherein step (e) comprises:
   (i) combing between the current line of the original video signal and the previous line of the original video signal;
   (ii) combing between the current line of the original video signal and the subsequent line of the original video signal; and (iii) blending the results of steps (e)(i) and (e)(ii) according to the comparison of step (c).

3. The method according to claim 1, wherein step (d) comprises:
  (i) weighting a result of a combing procedure heavily as compared to an alternate procedure when the difference between B3 and A3 is similar to the difference between B3 and C3; and
  (ii) weighting a luminance measure from the previous line of the sampled video signal more heavily than the result of the combing procedure, as a luminance measure for the current line of the sampled video signal, when the difference between B3 and A3 is different from the difference between B3 and C3.

4. The method according to claim 3, wherein step (d)(i) further comprises generating weighting factors according to results of steps (c)(vi) and (c)(vii), and step (e) comprises:
  (i) combing between a current line of the original video signal and a prior line of the original video signal;
  (ii) combing between the current line of the original video signal and a subsequent line of the original video signal; and
  (iii) blending the results of steps (e)(i) and (e)(ii) according to the weighting factors.

5. The method according to claim 4, wherein step (e)(iii) comprises:
  (1) providing greater weighting to the combing between the current line of the original video signal and the prior line of the original video signal, than to the combing between the current line of the original video signal and the subsequent line of the original video signal, when the difference between the values B2 and A4 and between the values B4 and A2 are greater than the difference between the values B2 and C4, and B4 and C2;
  (2) providing greater weighting to the combing between the current line of the original video signal and the subsequent line of the original video signal, than to the combing between the current line of the original video signal and the prior line of the original video signal, when the difference between the values B2 and A4, and between the values B4 and A2, are greater than the difference between the values B2 and C4, and B4 and C2; and
  (3) providing greater weighting to bandpass filtering the current line of the original video signal, than to the combing between lines of the original video signal, when the differences between the values B2 and A2, and between the values B2 and C2, are small relative to the differences between the values B2 and A4, B4 and A2, B2 and C4, and B4 and C2.

6. A method of processing a video signal having an original data stream, comprising:
  (a) comparing, with a decision logic device, points on a first line of a scan line triplet of the video signal to points on a second line of the scan line triplet of the video signal wherein comparing comprises:
    (i) identifying a point of interest located on the second line at a reference position in time;
    (ii) identifying a first point on the first scan line located at a first position in time prior to the reference position;
    (iii) identifying a second point on the first scan line located at a second position in time subsequent to the reference position;
    (iv) identifying a first point on the second scan line located at the first position prior to the reference position;
    (v) identifying a second point on the second scan line located at the second position subsequent to the reference position;
    (vi) calculating a maximum difference between the first point on the first scan line and the second point on the second scan line; and
    (vii) calculating a maximum difference between the second point on the first scan line and the first point on the second scan line;
  (1) applying, with a blending device, weights to an output of comb filtering and an output of band pass filtering based on step (a); and
  (c) outputting a processed signal from the blending device, wherein the processed signal comprises a combination of a portion of the output of comb filtering with the output of bandpass filtering according to the applied weights.

7. The method of claim 6, wherein the first position and the second position of each scan line are ½ cycle apart.

8. The method of claim 6, wherein the first position and the second position of each scan line are each ¼ cycle away from the reference position.

9. The method of claim 8, wherein step (b) comprises providing a higher weight to the output of comb filtering than the output of band pass filtering at the point of interest when the results of step (a)(vi) and step (a)(vii) are relatively small.

10. The method of claim 9, further comprising:
  (d) comparing points on the second line of the scan triplet of the video signal to points on a third line of the scan triplet of the video signal;
  (e) determining weights for the output of comb filtering and the output of band pass filtering of the second and third lines based on the result of step (d); and
  (f) applying decision logic to the original data stream based on step (e).

11. The method of claim 10, further comprising:
  (g) calculating the difference between the results of step (a)(vi) and step (a)(vii) for the first and second scan lines;
  (h) calculating the difference between the results of step (a)(vi) and step (a)(vii) for the second and third scan lines; and
  (i) blending at the point of interest, wherein said blending is based on the result of steps (b) and (e), and the differences calculated in steps (g) and (h).

* * * * *

UNITED STATES PATENT AND TRADEMARK OFFICE
CERTIFICATE OF CORRECTION

| | |
|---|---|
| PATENT NO. | : 7,688,387 B2 |
| APPLICATION NO. | : 10/641160 |
| DATED | : March 30, 2010 |
| INVENTOR(S) | : Shawn V. Johnson |

It is certified that error appears in the above-identified patent and that said Letters Patent is hereby corrected as shown below:

Column 10
Line 21, please replace "(1) applying," with --(b) applying,--

Signed and Sealed this

Fifteenth Day of June, 2010

David J. Kappos
*Director of the United States Patent and Trademark Office*